United States Patent [19]

Quick

[11] 4,152,883

[45] May 8, 1979

[54] HARVESTER FOR SUGAR CANE

[75] Inventor: Donald J. Quick, Branvan, Australia

[73] Assignee: Massey-Ferguson Services N.V., Curacao, Netherlands

[21] Appl. No.: 785,465

[22] Filed: Apr. 7, 1977

[30] Foreign Application Priority Data

Apr. 20, 1976 [GB] United Kingdom ............... 15887/76

[51] Int. Cl.² .......................................... A01D 45/10
[52] U.S. Cl. .................................................. 56/13.9
[58] Field of Search ................... 56/13.9, 13.5, 53–119, 56/14.5, 16.6

[56] References Cited

U.S. PATENT DOCUMENTS 3,942,307 3/1976 Quick .................................... 56/13.6

FOREIGN PATENT DOCUMENTS 2451186 5/1925 Fed. Rep. of Germany ............ 56/13.9
2322136 11/1973 Fed. Rep. of Germany ............ 56/13.9

Primary Examiner—Russell R. Kinsey
Attorney, Agent, or Firm—Robert L. Farris

[57] ABSTRACT

A sugar cane harvester has power-rotated rollers to convey severed cane sticks between stick-serving base cutters and stick dividing choppers. The rollers extend across the path of the cane sticks and at least one of the rollers below the cane path has stick-engaging paddles of differing radial lengths whereby the cane sticks are shaken up and down to dislodge earth mixed with the mat of cane sticks.

9 Claims, 4 Drawing Figures

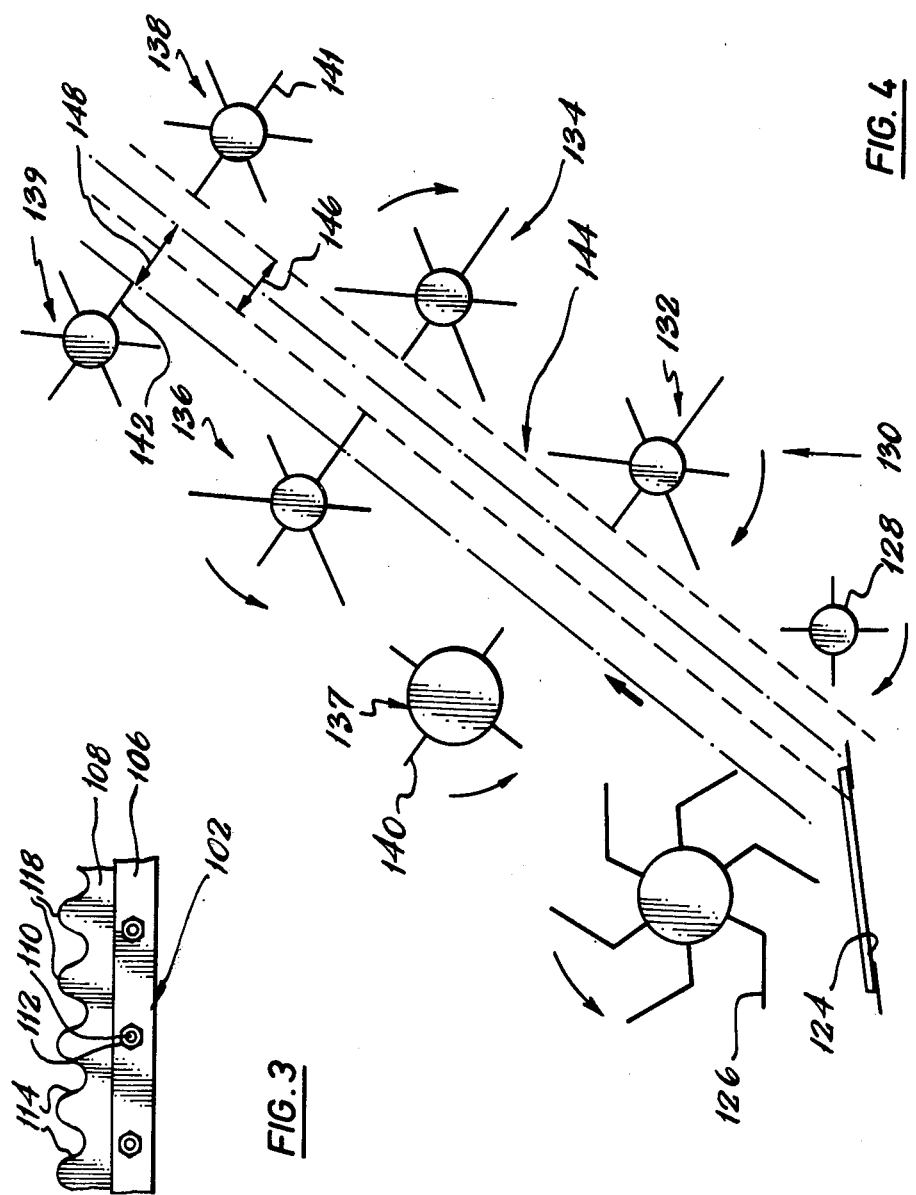

HARVESTER FOR SUGAR CANE

This invention relates to harvesters for sugar cane or similar crops such as bamboo.

A problem which arises in mechanical sugar cane harvesting is the removal of earth or soil and stones from the cane sticks after they have been severed from their roots by basecutters.

It should be understood that the basecutters are intended to be adjusted so that they sever the cane sticks at a position about 5 centimetres below the surface of the soil. Therefore, in use, the basecutters shatter the soil into particles which are mixed through the bundle of cane sticks as it enters the harvester.

At high rates of harvesting, the bundle of harvested cane stocks almost fills the throat of the harvester through which it is fed and it will therefore be appreciated that the removal of earth and stones from this almost solid bundle of sticks represents a difficult problem.

Feeding and cleaning rollers having an open framework structure are known for use on sugar cane harvesters. These rollers have paddle elements which engage and grip the cane sticks and feed them through the harvester. The open framework structure of the rollers and the spacing between the rollers allows earth which is dislodged from the bundle or layer of cane sticks to fall away to the ground. The problem of earth which is not dislodged remains however.

An object of the invention is to provide a harvester for sugar cane or similar crops having roller means to convey severed cane sticks between base cutting means and cane chopping means wherein said roller means has improved characteristics in relation to separation of earth from said can sticks.

According to the invention there is provided a harvester for sugar cane or similar crops comprising: base cutting means capable of severing crop sticks from their roots;

cane chopping means operative to cut cane sticks into two or more pieces; and roller means operative to convey severed cane sticks between said base cutting means and said cane chopping means;

said roller means comprising at least one roller and a drive to rotate said roller about a rotation axis extending longitudinally of the roller;

said roller comprising feed elements which extend longitudinally of the roller and which are engageable with said crop sticks, the feed elements being mounted on support means therefor at fixed positions relative to said rotation axis;

characterized in that the distance measured in the radial direction between said rotation axis and the radially outer end of one of the feed elements is greater than the distance measured in the radial direction between said rotation axis and the radially outer end of another of said feed elements.

An embodiment of the invention will now be described by way of example with reference to the accompanying drawings in which:

FIG. 3 shows an elevation view of a portion of a feed element of a shaking roller seen in FIG. 2; and FIG. 4 shows in a view similar to that of FIG. 2, base cutting means and modified roller means.

Figure 1:
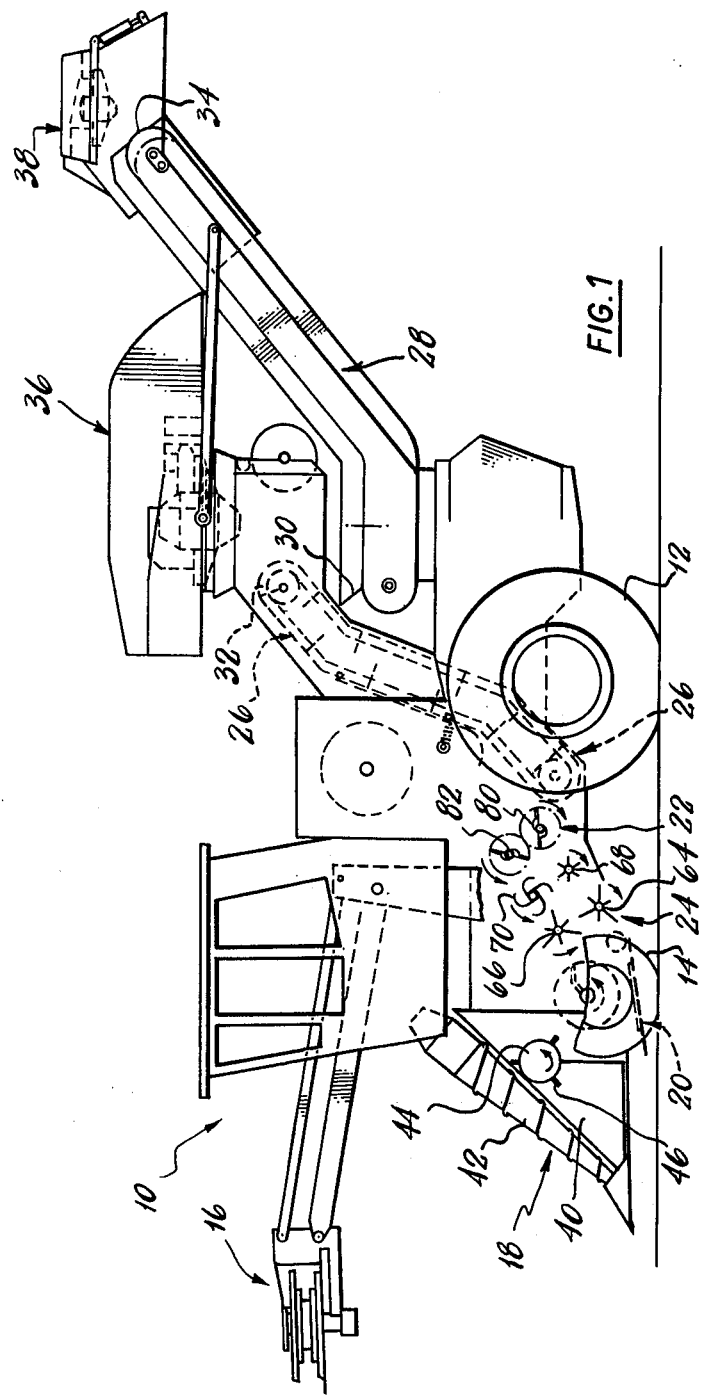
FIG. 1 shows a sugar cane harvester in side elevation, with its internal crop handling apparatus indicated.

As shown in FIG. 1, a sugar cane harvester 10 comprises rear drive wheels 12 and forward steerable wheels 14, cane topping apparatus 16 for removing tops from standing cane, stick gathering means 18, base cutting means 20, cane chopping means 22 and roller means 24 operative to convey severed cane sticks from said base cutting means to said cane chopping means.

A chain and slat type primary elevator 26 is positioned to receive billets from cane chopping means 22. A secondary chain and slat type elevator 28 has a hopper 30 to receive billets from the discharge end 32 of the primary elevator. Billets are discharged from the upper end 34 of the secondary elevator into transport vehicles (not shown).

Two sets of fan-operated trash removal apparatus 36 and 38 draw air through the streams of billets falling from the discharge ends 32 and 34 respectively of the primary and secondary billet elevators.

Stick gathering means 18 comprises a pair of upstanding, laterally spaced gathering walls 40 defining a crop gathering throat. Each gathering wall is surmounted by its own inclined power-rotated stick lifting auger 42.

A feed in roller 44 having three scalloped paddles 46 is mounted between gathering walls 40 to assist inward movement of cane sticks and to bend forward standing cane sticks to promote efficient cutting by base cutters 20.

Figure 2:
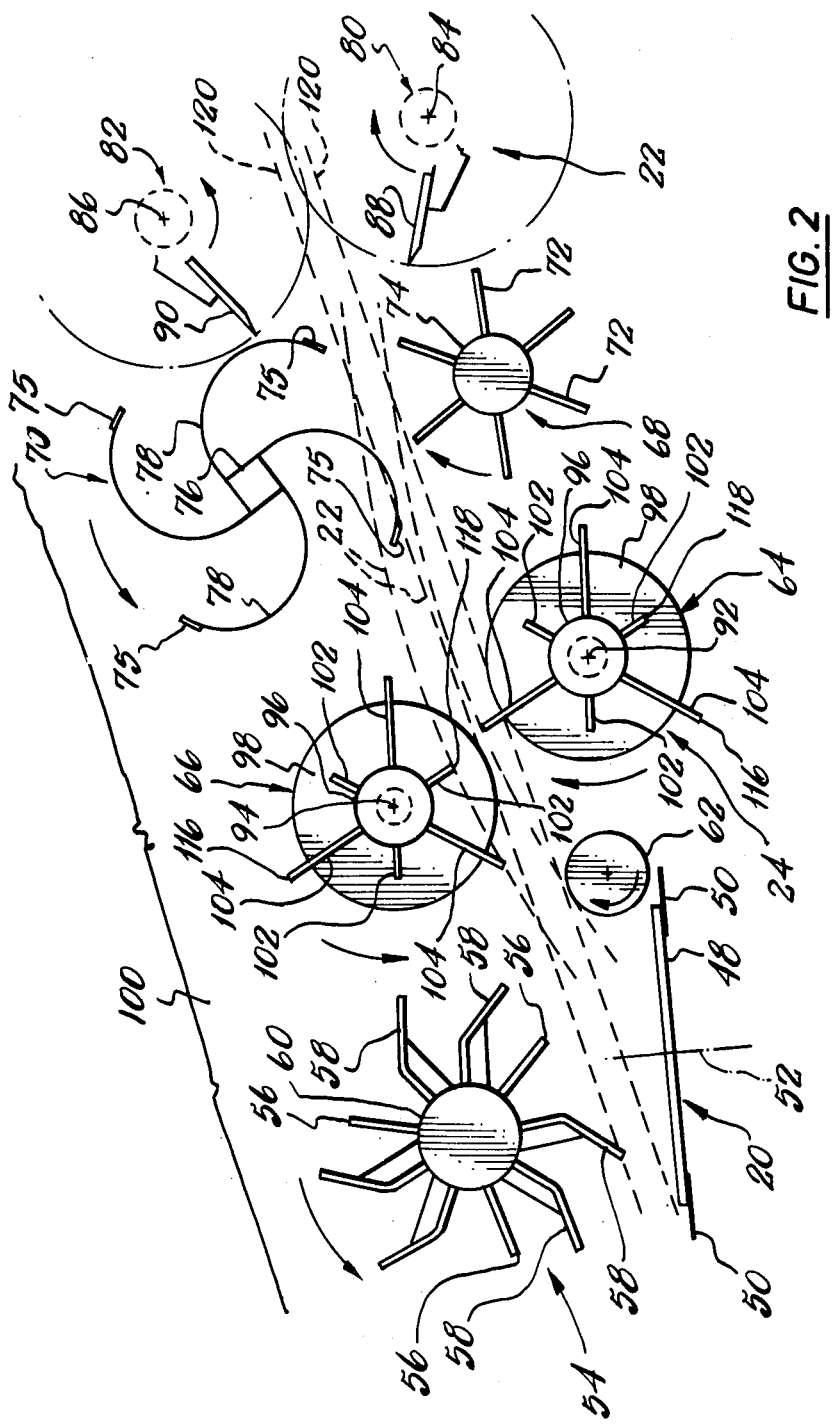
FIG. 2 shows, on a larger scale a portion of the harvester of FIG. 1 including basecutting means, cane chopping means and roller means to convey severed cane sticks between the base cutting means and the cane chopping means.

Referring now to FIG. 2, base cutting means 20 comprises a pair of laterally spaced discs 48 each carrying projecting blades 50 and rotatable about respective upwardly converging axes 52. Base cutting means 20 are fully disclosed in U.S. Pat. No. 4,098,060.

A spiked tooth power feed roller 54, having three axially-extending scalloped paddles 56 and six spikes 58 mounted on a central tube 60, is itself mounted directly above the base cutting means 20. The spikes 58 are secured to tube 60 at equally spaced positions on a common helix. Roller 54 is power-rotated in the direction indicated and may be mounted so as to be capable of floating up and down to accommodate varying volumes of cane flow. In use, the roller exerts a downward pressure on the cane Structure which would allow floating is not illustrated in the Drawing. as the cane passes over the base cutters. In this way it assists feeding of the cane by the base cutters by maintaining frictional contact between the crop and the upper surfaces of discs 48.

A butt lifter roller 62 is mounted immediately behind the base cutting means 20 and is power-rotated in the direction indicated. It operates to raise the butt ends of the cane sticks and ensure that they pass over it and are thereby guided and fed in the desired direction.

Roller means 24 which feeds the cane sticks from base cutting means 20 to cane chopping means 22 comprises spaced apart first and second shaking and feeding rollers 64 and 66 (to be described more fully below) and a further pair of power-rotatable feeding rollers 68 and 70.

Feeding roller 68 comprises six paddles 72 mounted on a central shaft 74. Roller 70 comprises four axially-extending feeding elements or bars 75 resiliently supported on a central square shaft 76 by a series of leaf spring (constituting spring means) 78. The leaf springs permit inward and outward movement of the cane feeding bars 75 towards and away from the axis of rotation of the roller so that the roller automatically accommodates itself to varying thicknesses of the cane layer passing between the rollers and to shaking movement of the cane mat produced by rollers 64, 66.

Part of cane chopping means 22 is shown in FIG. 2. The cane chopping means comprises a pair of power driven chopper drums 80 and 82 which contra-rotate so as to be in-running about respective axes 84 and 86. Each of the chopper drums 80 and 82, carries a pair of cane chopping blades 88, 90 respectively, which extend axially along the length of the drum. The blades of the two drums co-operate in pairs to chop canes passing therebetween into billets about 30 centimetres in length.

The shaking and feeding rollers 64, 66 are provided with a drive (not shown) to rotate them about respective rotation axes 92, 94 extending longitudinally of the rollers. The drive is of any conventional form such as a chain or gear drive. The drive interconnects the shaking rollers so that, firstly, they are contrarotated inwards and feed rearwards the canes passing between them, and secondly, (for a reason to be explained below) they rotate in timed relationship.

The structure of the shaking rollers 64, 66 will now be described. Each roller extends substantially horizontally and at right angles to the direction of usual forward motion of the harvester and comprises a central shaft or tube 96 arranged coaxially with the drive axes 92 or 94 of the roller. At each end of shaft 96 is an end disc 98 welded to the shaft. Each end disc lies close to its respective side wall 100 of the channel through which the roller means 24 feeds the cane.

Each shaking roller 64, 66 further comprises three small feed elements 102 and three large feed elements 104. The feed elements 102, 104 are mounted on support means therefor (constituted by end discs 98 and central shaft 96) at fixed positions relative to the drive axis 92 or 94 of their respective rollers, for engagement with the cane sticks to be fed through the harvester.

The form of each of the feed elements 102 and 104 is that of a bar or plate extending longitudinally of its respective roller. One of the small feed elements 102 is shown in FIG. 3. It comprises a flange 106 welded to central shaft 96 and to end discs 98, together with a bar 108 secured to the flange by a series of bolts 110 and associated nuts 112. The outer edge of bar 108 is formed with a series of scallops 114 of a size such that cane sticks can enter therein, one at a time, and be gripped.

The large feed elements 104 are identical in structure to the small feed elements 102 but the flanges (corresponding to item 106 in FIG. 3) are somewhat smaller.

As can clearly be seen in FIG. 2 the large feed elements 104 project considerably further outwards from the rollers 64, 66 than the small feed elements 102. That is to say, the distance measured in the radial direction between the rotation axis 92 or 94 and the radially outer ends 116 of the large feed elements 104 is greater than the distance measured in the radial direction between the drive axis 92 or 94 and the radially outer ends 118 of the small feed elements 102.

It can now be appreciated that since the large feed elements 104 alternate around the axes or rollers 64, 66, with small feed elements 102, the cane sticks passing between the rollers will be alternately pushed away from the rollers and then allowed to return.

Furthermore, since rollers 64, 66 are driven in timed relationship, the phase relationship between the large and small feed elements shown in FIG. 2 is maintained at all times. Thus, the rollers are timed so that when (as shown in FIG. 2) a large feed element 104 on lower roller 64 engages the cane, the feed element on roller 66 which is engaging the cane is a small one 102. This therefore allows the layer of cane sticks passing through the harvester, which would usually follow the linear path 120, to be deflected upwards in the curved path 122. When the next pair of feed elements engage the cane, the situation is reversed and the cane layer is moved or bent in the opposite direction. Thus the rollers 64, 66 effectively shake the cane layer.

In use, cane sticks are topped by topping apparatus 16, gathered by augers 42, severed by base cutting means 20, and fed to chopping means 22 by roller means 24. Billets from the chopping means are elevated and cleaned successively by elevators 26 and 28 and trash removal apparatus 36 and 38.

As the mat of cane sticks passes between shaking rollers 64 and 66 it is shaken up and down rapidly, as described above, and earth and stones are thereby dislodged and fall between the rollers back to the ground. The rollers 64, 66 therefore provide a supplementary cleaning action on the cane. This is the principal advantage of the embodiment of the invention described above.

Furthermore, it will be appreciated that the invention adds very little indeed to the cost of the harvester.

A second embodiment of the invention is shown in FIG. 4 in which are shown base cutters 124, a feed in roller 126, and a butt lifter roller 128, constructed and arranged in a manner similar to that of the corresponding components 20, 54 and 62 respectively, in the embodiment described above. These items are therefore not described any further.

Positioned to receive cane sticks from butt lifter roller 128 is roller means 130 comprising six rollers, of which three, 132, 134 and 136, are constructed to provide a shaking action in accordance with the teaching of the invention, and the other three rollers, 137, 138 and 139, are of conventional structure having paddles 140, 141, 142 to feed the cane. For each of the rollers 137, 138, 139 all of the feed elements are of the same radial length (though the radial length of the feed elements of one of the rollers is not necessarily the same as that of the other). Roller 137 is positioned to engage bent cane stalks when tangled cane is being harvested.

The structure of rollers 132, 134 and 136 and their drives is substantially the same as that of rollers 64 and 66 in the previous embodiment and is therefore not described any further.

In use, rollers 132, 134 and 136 shake the cane layer or mat 144 by pushing it from the position identified be reference numeral 146 (which is occupies when, as shown in FIG. 4, a large feed element on roller 136 and a small feed element on rollers 132 and 134 are engaging the cane layer) to the position 148 (which it occupies when the next feed element in each roller engages the cane).

The phase relationship of the feed element in the rollers 132, 134 and 136 is maintained by their drives and the shaking action they exert on the cane layer results in the separation therefrom of earth and stones lodged between the cane sticks.

Roller 139 is mounted so as to be able to move towards and away from roller 138 to accommodate shaking movement of the cane mat produced by rollers 132, 134, 136 while maintaining a grip thereon. A spring (not shown) biases roller 139 towards roller 138. The drive to roller 139 permits such movement. Drives permitting such movement of a driven member are well known and it is therefore believed to be unnecessary to describe and illustrate the drive here.

The pair of rollers 138, 139 constitute a further pair of power rotatable rollers, in addition to the shaking rollers 132, 134 and 136, and serve to assist smooth feeding of the cane to the chopping means.

Among modifications which could be made in the above embodiments without departing from the scope of the invention are the use of less than six feed elements on the shaking rollers. For example 2, 3, 4 or 5 feed elements could be used, though five or six are preferred. The number of feed elements which is acceptable should preferably be such as to produce sufficient cane feeding without undue damage to the cane, yet not so many that the interval (both in time and as regards space) between successive feed elements becomes too small to permit thorough shaking movement of the cane mat.

As regards the difference in height (measured radially from the roller axis) between the large and small feed elements, for rollers in which the outer ends of the large feed elements sweep out a circle of diameter between 15 and 75 centimentres a difference in height of from 10 to 50 percent (of the height of the large feed element) is appropriate.

It would also be possible to provide a roller with even only one feed element. Such a roller would not, on its own, be very effective for feeding purposes but would nevertheless produce a shaking action on the cane mat. Also, the feed elements need not all extend along the full length of the roller, nor need they be exactly parallel to the axis.

Furthermore, it is by no means essential to provide feed elements of differing heights on both the upper and the lower rollers. In many cases such as arrangement of feed elements is needed only on the roller or rollers below the cane mat.

I claim:

1. A harvester for sugar cane or similar crops comprising:
    a frame including a pair of laterally spaced gathering walls defining a throat;
    base cutting means capable of severing crop sticks from their roots mounted on the lower forward portion of the frame;
    cane chopping means operative to cut cane sticks into two or more pieces mounted on the frame above and to the rear of the base cutting means;
    and roller means rotatably mounted on the frame for conveying severed cane sticks through said throat from said base cutting means to said cane chopping means;
    said roller means comprising at least one driven roller rotatable about a rotation axis extending longitudinally of the roller;
    said roller comprising a support and a plurality of feed elements mounted on the support and extending longitudinally of the roller with outer edges that are engageable with said crop sticks;
    and wherein the distance measured in the radial direction between said rotation axis and the radially outer edge of one of the feed elements is greater than the distance measured in the radial direction between said rotation axis and the radially outer edge of another of said feed elements.

2. A harvester according to claim 1 characterized in that said feed elements are in the form of bars or plates.

3. A harvester according to claim 1 characterized in that said roller is positioned so that said crop sticks pass above the roller, the roller extending substantially horizontally and at right angles to the direction of usual forward motion of the harvester.

4. A harvester according to claim 1 characterized in that said roller means comprises a second drivable roller mounted on the frame for rotation about a respective rotation axis and spaced from said one driven roller so that crop is fed between the two rollers, said second roller also having a support and a plurality of feed elements mounted on the support with outer edges engageable with said crop sticks, the radial distances between the second roller's rotation axis and the radially outer edges of two of its feed elements differing one from the other, and a drive for rotating said rollers so that they are contra-rotated in timed relationship to convey crop sticks between them.

5. A harvester according to claim 1 characterized in that said roller or at least one of said rollers comprises at least 4 feed elements.

6. A harvester according to claim 1 characterized in that said roller or at least one of said rollers comprises at least 6 feed elements.

7. A harvester according to claim 1 characterized in that said feed elements comprise bars with scalloped outer edges.

8. A harvester according to claim 1 characterized in that said roller means comprises a further pair of power rotatable rollers between which the cane passes before reaching the cane chopping means, and wherein at least one of said further pair of rollers comprises a support and resiliently supported feed elements mounted on the support for movement towards and away from the axis of rotation of the roller.

9. A harvester according to claim 3 characterized in that said roller means comprises a further drivable roller positioned so that said crop sticks pass below the roller, the further roller comprising resiliently supported feed elements movable towards and away from the axis of rotation of the further roller in response to movement of the crop mat.

* * * * *